Patented Sept. 25, 1951

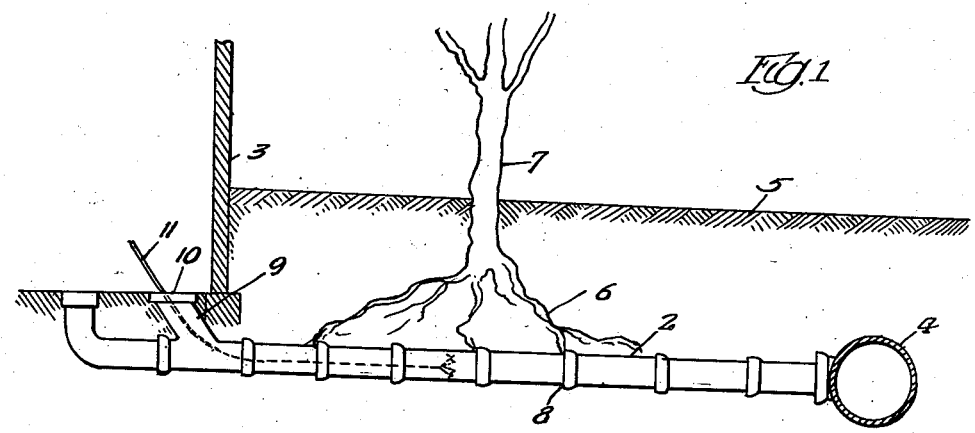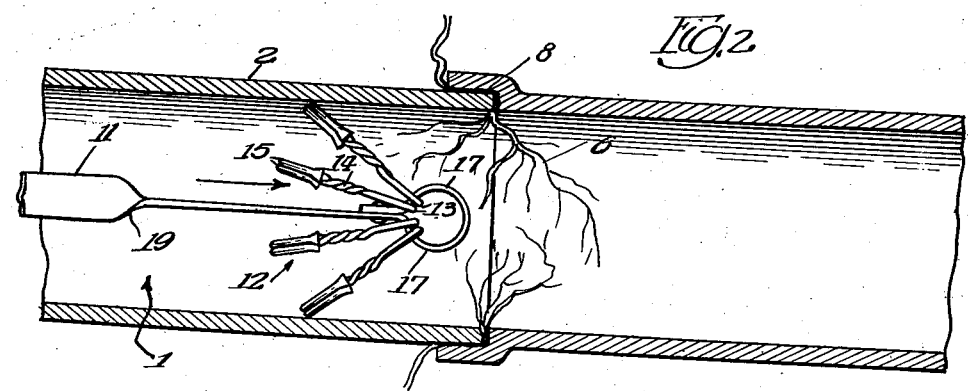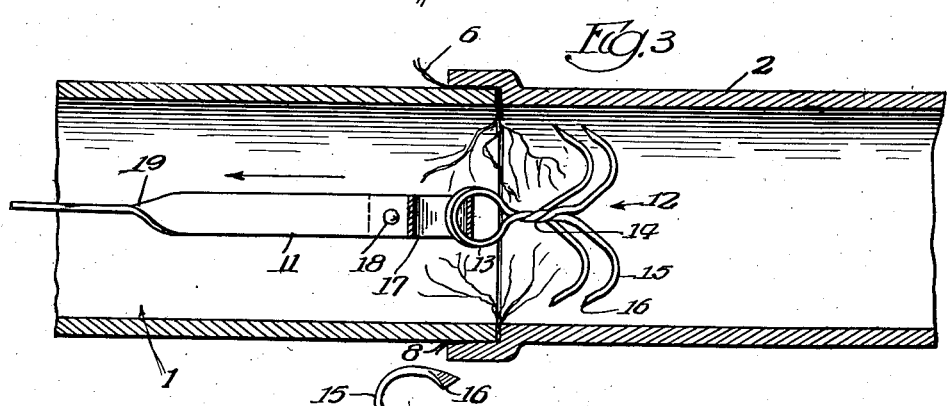

2,569,008

UNITED STATES PATENT OFFICE 2,569,008

CLEANING TOOL HAVING HOOKLIKE ELEMENTS CONNECTED TO A FLEXIBLE ROD BY FULLY REVERSIBLE, FREELY OPERABLE HINGE JOINTS AND HOOKLIKE ELEMENTS THEREFOR

Alphons N. Kraft, Madison, Wis.

Application October 19, 1944, Serial No. 559,449

12 Claims. (Cl. 15—104.3)

The present invention relates to cleaning tools for sewer mains and more specifically to tools for cleaning root growths and similar foreign bodies from the interior of the main.

One of the objects of the invention is to provide a novel and unique cutting tool adapted to cut root growths from the interior of the main.

Another object of the invention is to provide a novel remotely operable cleaning tool provided with means to cut root growths and the like, said tool being completely manually operable, thereby eliminating the use of complicated mechanisms.

A further object of the invention is to provide a cleaning tool having a plurality of small, sharp cutting edges, each of which is adapted to cut root growths and the like away from the interior of a sewer main.

Numerous other objects and advantages will be apparent throughout the progress of the following specification.

Referring to the drawings:

Fig. 1 is a detail sectional view illustrating a feeder main from a house to a principal sewer main and the manner in which tree roots may extend into the pipe joints;

Fig. 2 is a longitudinal section through the feeder main from the house to the principal main and illustrates the entry into the feeder main of a tool embodying the present invention so as to cut off roots projecting into the sewer pipe;

Fig. 3 is a longitudinal section, looking downwardly in Fig. 2, through the feeder main illustrating the position of the improved tool during withdrawal; and Fig. 4 is a detail perspective view of one of the cutting elements of the tool.

The particular cleaning tool 1 herein disclosed for the purpose of describing the invention is illustrated in association with a feeder main 2. The feeder main 2 connects the interior sewerage system of a house 3 with a principal sewer main 4 and is generally located immediately below the frost level in the ground 5 between the house and the principal main.

The problem of keeping the feeder main 2 open to permit a free flow of sewerage from the house to the principal main confronts many home owners and most plumbers. This problem is frequently caused by root growths which find their way into the interior of the main and clog its bore, as, for instance, the roots 6 of the shade trees 7 which grow in the soil 5 in proximity to the feeder main. After the trees 7 have grown for some time, their roots 6, in their customary search for water, usually find entry into the feeder main through one of the joints 7 and, in the course of time, infiltrate through minute cracks in the joints until they reach the interior of the feeder main. Once having reached the interior, the roots 6 continue to grow, enlarging their entry cracks and eventually nearly filling a cross section of the interior of the main 2. After this growth is continued for some time, the feeder main 2 will become fully dammed, the flow of sewerage will stop and the entire sewerage system within the house will become "backed up."

Heretofore this root growth has sometimes been removed by a complete excavation of the main. The root growth was then cut away and new sewer pipes were laid. This remedy is relatively expensive and is effective only until small cracks develop in the system and the roots are again able to find their way into the interior of the main.

To eliminate this expense, motor driven cleaning tools have been developed. In general, these cleaning tools comprise a long, flexible, motor rotated cable which may be fed through an opening 10 in a clean-out elbow 9 in the feeder main. The remote end of the motor rotated cable is then fitted with any one of many types of rotatable cutting tools. These cutting tools are fed into the interior of the feeder main, and rotation of the cable by the motor rotates the cutting tool for the purpose of removing the root growths. Many plumbers have found this method of removing foreign bodies quite ineffective. Further, the motor, with its cables and cutting tools, is relatively expensive, is quite heavy and is complicated. The weight of the equipment and the time required to assemble the equipment makes it difficult to move the cleaning tool from one location to another.

The present invention provides a simple, manually operable means which positively removes the most stubborn root growth or like obstructions from the interior of the feeder main. As illustrated, a conventional flexible sewer rod 11 is fed through the elbow 9 into the feeder main. Although this sewer rod may be of any desired type, it has been found that very satisfactory results may be obtained by using galvanized flexible steel tape ¾ in. wide by $\tfrac{3}{32}$ in. thick. At the end of the sewer rod which is fed into the interior of the main, a plurality of cutting hooks 12 are provided.

These hooks (Fig. 4) are made preferably of a good quality spring steel wire of No. 11 gauge, for example. The wire is twisted to form an eye 13, a twisted shank 14, and a plurality of bows 15. The end of each bow 15 is flattened and is provided with a sharp chisel-like edge 16.

Entry of the cleaning tool 1 into the bore of the feeder main 2 permits the hooks 12 to lie relatively parallel with the sewer rod 11 with their cutting edges 16 facing in the direction of the movement of the rod (Fig. 2). A plurality of hooks and associated cutting edges present a substantial cutting front. As the rod is pushed forwardly, at least one of the cutting edges, and possibly a majority bear against the root growth, thereby cutting it and severing it from the interior of the main. On the return stroke, Fig. 3, the hooks are permitted to reverse and the cutting operation is repeated on the return stroke.

The within described cleaning tool operates particularly efficiently if the chisel edges are spread apart somewhat so that at least one edge will be urged against the interior wall of the main. As the tool is reciprocated, the edge will then attack the root growth where it is held relatively rigidly and the cutting efficiency is vastly improved over the cutting efficiency at some distance from the wall. The cutting edges also should be preferably narrow instead of wide, since the narrow edge cuts with less physical effort and is not inclined to slip past the root without cutting.

In actual use, the cutting elements of the tool may be fed past all of the root growths to the final growth before the feeder main enters the principal main. The tool is then reciprocated until the clogging root growth has been cut free and is severed from the interior of the main. Water may then be sent through the feeder main and the growth will be washed into the principal main. This process is repeated, growth for growth, from the principal main to the house until the entire bore of the sewer has been cleaned. Alternately, the root growths may be attacked in the reverse order, that is, from the house to the principal main. In that event, after the root growth has been severed, the cutting hooks are then used similarly to grappling hooks to pull the root growth into the house.

Frequently the feeder mains are provided with turns or elbows and are not in the straight line illustrated in the drawings. To improve the ability of the sewer rod to work its way along an irregularly laid feeder main, a twist 19 is provided at one end of the sewer rod.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A reciprocable cleaning tool for a main including a flexible rod, a plurality of hook-like elements and a fully reversible, freely operable, hinge joint connecting each of said elements to one end of said rod.

2. A reciprocable cleaning tool for a main including a flexible rod, a plurality of hook-like elements, each said element being provided with at least one chisel cutting edge adapted to cut a foreign body within the main, and a fully reversible, freely operable, hinge joint connecting each of said elements to one end of said rod.

3. A reciprocable cleaning tool for a main including a flexible rod and a plurality of hook-like elements, each said element being provided with a plurality of cutting edges adapted to cut a foreign body within the main, and a fully reversible, freely operable, hinge joint connecting each of said elements to one end of said rod.

4. A reciprocable cleaning tool for a main including a flexible rod, a plurality of hook-like elements, each element being provided with at least one chisel-like cutting edge adapted to cut a foreign body within the main and a fully reversible, freely operable, hinge joint connecting each of said hook-like elements to one end of said rod, whereby the chisel edge is presented to the foreign body upon successive reciprocations of the cleaning tool.

5. A reciprocable cleaning tool for a main including a flexible rod, and a plurality of hook-like elements, each said element including an eyelet, a shank, at least one bow, and a cutting edge on said bow, and a fully reversible, freely operable, hinge joint connecting each of said hook-like elements to one end of said rod, one element of said hinge comprising the aforementioned eyelet and another element of said hinge comprising a loop on the end of said rod.

6. A reciprocable cleaning tool for a main including a flexible rod, a plurality of hook-like elements, each said element comprising a plurality of bows and a cutting edge on each bow, and a fully reversible, freely operable, hinge joint connecting each of said hook-like elements to one end of the sewer rod.

7. A reciprocable cleaning tool for a main including a sewer rod, a loop at one end of said sewer rod, and a plurality of hook-like elements, each of said hook-like elements being provided with a loop, the loops of said hook-like elements being interengaged with the loop of said sewer rod, whereby said hook-like elements are automatically reversed upon successive reciprocations of said cleaning tool.

8. A reciprocable cleaning tool for a main including a flexible rod, a loop at one end of said sewer rod, and a plurality of hook-like elements, each of said hook-like elements being provided with a loop, each element also being provided with at least one chisel cutting edge adapted to cut a foreign body within the main, the loops of said hook-like elements being interengaged with the loop of said sewer rod, whereby said hook-like elements and the chisel cutting edges carried thereby are automatically reversed upon successive reciprocations of said cleaning tool.

9. A reciprocable cleaning tool for a main including a flexible rod, a loop at one end of said rod, and a plurality of hook-like elements reversibly secured to one end of sewer rod, each element being provided with a plurality of cutting edges adapted to cut a foreign body within the main, each element being further provided with a loop, the loops of said hook-like elements being interengaged with the loop of said sewer rod, whereby said hook-like elements and the cutting edges carried thereby are automatically reversed upon successive reciprocations of said cleaning tool.

10. A reciprocable cleaning tool for a main including a flexible rod, a loop at one end of said rod, a plurality of hook-like elements, each element being provided with at least one chisel-like cutting edge and each element further being provided with a loop, the loops of said hook-like elements being interengaged with the loop of said sewer rod, whereby said cutting edges are automatically reversed upon successive reciprocations of said cutting tool so as to present said chiseled edges to the foreign body upon each reciprocation of the cutting tool thereby cutting the foreign body within the main.

11. A reciprocable cleaning tool for a main including a flexible rod, a loop at one end of said rod, and a plurality of hook-like elements, each element including an eyelet, a shank, at least one bow and a cutting edge on said bow, the eyelets of said hook-like elements being interengaged with the loop of said rod, whereby said hook-like elements and the cutting edges carried thereby are automatically reversed upon successive reciprocations of said cleaning tool.

12. A reciprocable cleaning tool for a main including a flexible rod, a loop at one end of said rod, and a plurality of hook-like elements, each element including an eyelet, a plurality of bows and a cutting edge on each bow, the eyes of said hook-like elements being interengaged with the loop of said rod, whereby said hook-like elements and the cutting edges carried thereby are automatically reversed upon successive reciprocations of said cleaning tool.

ALPHONS N. KRAFT.

REFERENCES CITED

The following references are of record in the file of this patent:

UNITED STATES PATENTS

| Number | Name | Date |
|---|---|---|
| 272,437 | Higgins | Feb. 20, 1883 |
| 302,634 | Keating | July 29, 1884 |
| 834,135 | Hymes | Oct. 23, 1906 |
| 1,051,992 | Fisher et al. | Feb. 4, 1913 |
| 1,077,784 | Asbury et al. | Nov. 4, 1913 |
| 1,105,528 | Nelson | July 28, 1914 |
| 1,185,688 | La Marsh | June 6, 1916 |
| 1,592,357 | Harden | July 13, 1926 |
| 2,038,004 | Russell | Apr. 21, 1936 |
| 2,115,266 | Johnson | Apr. 26, 1938 |
| 2,249,254 | Osborn | July 15, 1941 |
| 2,292,713 | O'Leary | Aug. 11, 1942 |
| 2,341,435 | Galea | Feb. 8, 1944 |

FOREIGN PATENTS

| Number | Country | Date |
|---|---|---|
| 11,228 | Great Britain | 1911 |